United States Statutory Invention Registration [19]

[11] Reg. Number: H17
[45] Published: Feb. 4, 1986

Wenthe, Jr.

[54] COMPUTER FORMS WEB COPYING APPARATUS

[75] Inventor: Stephen J. Wenthe, Jr., Rochester, N.Y.
[73] Assignee: Xerox Corporation, Stamford, Conn.

[21] Appl. No.: 526,730
[22] Filed: Aug. 26, 1983
[51] Int. Cl.[4] ..... G03B 1/24
[52] U.S. Cl. ..... 226/76; 226/76; 226/127; 226/196
[58] Field of Search ..... 355/75, 3 SH, 14 R, 355/14 SH, 76; 226/74. 75, 76, 157, 127; 400/613.2, 613.4, 624, 625, 629; 226/196

[56] References Cited

U.S. PATENT DOCUMENTS

| | | | |
|---|---|---|---|
| 2,493,411 | 1/1950 | Lanegan et al. | 271/2.4 |
| 3,255,662 | 6/1966 | Call | 88/24 |
| 3,726,589 | 4/1973 | Difulvio et al. | 355/64 |
| 3,901,594 | 8/1975 | Robertson | 355/18 |
| 3,977,780 | 8/1976 | Cassano et al. | 355/3 R X |
| 3,994,426 | 11/1976 | Zahradnik et al. | 226/74 X |
| 4,086,007 | 4/1978 | Smith et al. | 355/3 R |
| 4,087,172 | 5/1978 | Van Dongen | 355/14 |
| 4,176,945 | 12/1979 | Holzhauser et al. | 355/14 SH X |
| 4,264,200 | 4/1981 | Ticknor et al. | 355/75 |
| 4,300,710 | 11/1981 | DuBois et al. | 226/74 |
| 4,320,960 | 3/1982 | Ward et al. | 355/14 R |
| 4,334,764 | 6/1982 | Rawson et al. | 355/14 SH |
| 4,486,093 | 12/1984 | McNew | 355/29 |

FOREIGN PATENT DOCUMENTS

| | | | |
|---|---|---|---|
| 0005043 | 10/1979 | European Pat. Off. . | |
| 57-175146 | 11/1982 | Japan | 27/62 |

OTHER PUBLICATIONS

*3M Corporation.* Thermal printer with a fan-fold paper feeder stack of interest, Model No. 267 G.

Anonymous Disclosure; "Supply hopper for continuous forms"; *Research Disclosure" No. 23120, Jul. 1983, pp. 235-236.*

Eastman Kodak Ektaprint 200 computer forms feeder-Advertisement photograph attached from p. 1900 of ABA Journal, Dec. 1983. [Note similarity to R. D. Pub. No. 23120].

*Primary Examiner*—Thomas H. Tarcza
*Assistant Examiner*—Mark Hellner

[57] ABSTRACT

In a continuous form document feeder for a copier, for incrementally feeding a computer form or the like web document from a fan-folded stack thereof to the imaging station of a copier with a web feeder, the improvement in the supply hopper in which the fan-fold web stack is stacked and from which the web is unfolded and fed out to be copied with said web feeder, wherein said supply hopper has a generally horizontal main stack supporting floor for supporting the principal portion of the stack of fan-fold web, a downstream stack edge retaining low wall extending upwardly not substantially above the maximum height of the stack of web to be fed from the supply hopper and adjacent the end of the supply hopper from which the web is to be fed out to be copied, this low wall being adapted to retain one end of the stack of fan-fold web in the supply hopper but to provide low friction and low angle feeding of the web from the stack thereover, and a raised stack floor portion adjacent the end of the supply hopper opposite from the low wall and extending upwardly from the main floor to slightly tilt upwardly (relative to the rest of the stack) the end of the stack of fan-fold web in the supply hopper opposite from the low wall sufficiently to substantially reduce variations in the resistance to unfolding and feeding of the web from the stack thereof by the web feeder. This raised stack floor portion preferably extends upwardly at approximately 10 degrees to the main floor and is adapted to raise the upstream end of the stack by at least approximately 1 centimeter relative to the rest of the stack.

11 Claims, 2 Drawing Figures

Figure 1:
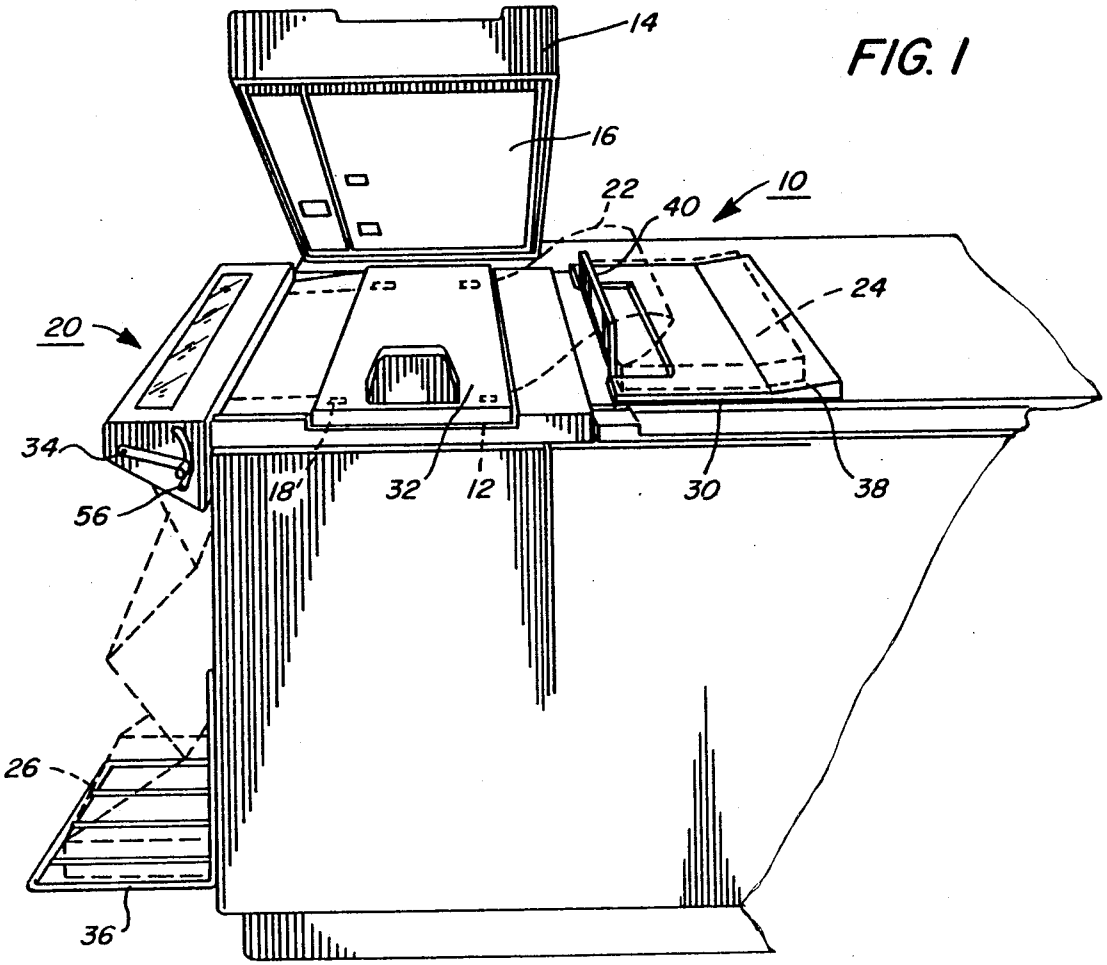

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMPUTER FORMS WEB COPYING APPARATUS

The present invention relates to improved apparatus for automatically incrementally transporting computer form or the like web to a copier imaging station for copying. It is particularly suitable for a compatible and low-cost computer form feeder accessory for a copier having existing document handling apparatus for individual document sheets.

As xerographic and other copiers increase in speed, and become more automatic, it is increasingly important to provide higher speed yet more reliable and more automatic handling of the original documents being copied, i.e. the input to the copier. It is desirable to feed, register and copy document sheets of a variety or mixture of sizes, types, weights, materials, conditions and susceptibility to damage, yet with minimal document jamming, wear or damage by the same document transporting and registration apparatus, even if the same documents are automatically fed and registered repeatedly. One type of original document presenting particular problems, because of its differences and general incompatibility with conventional document sheet handling, is computer form web, or "CF" as referred to herein. This is the well known elongate web of odd-sized paper typically provided as the output of conventional computer printers. It comes in several different widths, but conventionally it has regular holes at ¼ inch (12.7 mm) intervals for its feeder along (closely adjacent) both edges. Generally it is stacked in zig-zag or "fan fold" form and thus, CF web is also called "fan fold". The increased use of computers has increased the number of "CF" documents and the need for convenience copies thereof.

Even with smaller and slower copying rate copiers, it has become increasingly desirable to provide at least semi-automatic document handling, allowing an operator to initial load originals into an input of a copier document handler, with the document handler automatically providing the final deskewing, registration and feeding of the documents into and through the copying position, and then ejecting the documents automatically. However, for compact and low cost copiers, an appropriate document handler must also be simple, low cost and compact.

A preferable document handling system is one that utilizes an existing or generally conventional copier optical imaging system, including the external transparent copying window (known as the platen) of the copier. It is also desirable that the document handling system be readily removable, to alternatively allow the copier operator to conventionally manually place documents, including books, on the same copying platen. Thus, a lighter weight document handler is desirable. It is also desirable for the same registration edge or position to be available for otherwise copying such manual copying as is used for the document handler.

As used herein in relation to CF, a "page" is the CF web segment, portion, frame or unseparated sheet to be copied onto a copy sheet. This often, but not necessarily, corresponds to the area between partial transverse slits, known as "perfs", provided for "bursting" the CF web into individual sheets. The present system does not require such separation or bursting of a CF web for its copying.

Illustrated herein is an exemplary semi-automatic CF web document feeder accessory compatible with an existing recirculating document handling system or "RDH" which is pivoted up away from a copier platen. However the present system may be used with copiers having no, or various other, document handling systems. It may also be integrally incorporated in another document handler, particularly those which are dual mode (RDH/SADH) types, and is compatible with either non-precollation or postcollation copying. These copying modes are further described, for example, in U.S. Pat. Nos. 4,080,063 issued Mar. 21, 1978 to D. J. Stemmle; 4,212,457 issued July 15, 1980 to J. Guenther; or 4,176,945 issued Dec. 4, 1979 to R. C. Holzhauser et al.

A severe limitation on over-platen document feeding and registering systems is that they must have sufficient feeding force to reliably and accurately incrementally feed the document, but not forces which can damage the document. In the case of CF web, for most copiers this means rapidly and accurately starting and stopping the web for each web increment being copied. The document feeding system should also minimize the introduction of document sheet skewing in the feeding of the document from the document stack to the registration or imaging position on the platen. Yet it is also desirable not to have excessive drag on the documents even though the guides and control surfaces to maintain positional control introduce drag forces. The document areas to be copied must be maintained within close positional tolerances on both axis over the platen and held close to the platen (within focus) to be properly imaged.

The feeding of a web of computer fan-fold (CF) paper as a document to be copied on the platen of a copier presents special problems. Such paper is typically generated by a line-printer output of a computer. It is usually wider than most standard paper sizes, and conventionally has round holes at one-half inch (12.7 mm) intervals (center-to-center) extending along both edges. These holes are provided for sprocket or pin feeding the web. The web is typically folded in a zig-zag or "fan folded" stack of partially perforated but unburst segments. It is not desirable to burst or separate the CF web in many cases, yet in many cases it is desired to make registered individual sheet copies of segments of the CF web, especially if reduction copying onto conventional size paper copy sheets is desired.

Usually a CF web is directly mechanically fed without any slippage with a sprocket wheel or a belt with pins (a "tractor" or "Kidder" drive) mating with the holes along both edges of the CF web. Various examples of such computer form feeders (CFF) are known in the art, and some are cited below. However, a serious disadvantage of the use of such a pin or tractor feeder for a copier is that such feeder cannot also feed conventional unperforated original document sheets, and thus separate document handler, units separately used, are conventional. There have been a few document feeders for copiers using friction feeding for both CF and conventional documents. Examples are disclosed in U.S. application Ser. Nos. 410,734 filed Aug. 23, 1978 (D/82091) and 417,257 filed Sept. 13, 1982 (D/81068) and references cited therein. However, such non-sprocket CF web document feeders have the additional problem of maintaining registration of the CF web segments to be copied, if they are to be copied onto individual copy sheets rather than a continuous copy web.

In contrast, with a pin or sprocket drive CFF the incremental advance of the tractor or other pin-drive system, by, e.g. a servo or stepper motor, equals that of the CF web increment, because there is no slippage, and thus only initial registration is needed. The present system can utilize a conventional and very low-cost non-slip feeder.

The incremental starting and stopping of the CFF web greatly increases the feeding forces on the CF document feeder and feeding difficulties. However, if a CF web is simply continuously moved over an imaging station (i.e. over a fixed optical scanning slit) it is difficult or impossible to obtain properly registered copying of selectable portions of the CF web onto conventional individual copy sheets. That is, to repeatedly automatically copy one complete frame or section of the CF web onto only one copy sheet, or onto several copy sheets when more than one copy of that one CF frame or segment is desired. Since there is only one document lead edge for the CF web, conventional lead edge registration cannot be used for subsequent web frames. Nor can document feeding errors be corrected in this manner, and thus they may be cumulative for the subsequent web frames. Nor can the pitch distance or interval between CF frames be changed since they are directly connected. Lateral misregistration or skew feeding of the CF web also tends to be cumulative, i.e. increasing with the length of CF web which is fed. Furthermore, a continuously moving type of CFF system is not readily compatible with normal full frame (full size platen) copying of stationary individual document sheets, which is particularly desirable for multiple copies.

U.S. Pat. No. 4,320,960 issued Mar. 23, 1982 (filed Sept. 17, 1979) to Joseph W. Ward and Russell G. Schroeder is a recent example of a commercial tractor sprocket drive computer forms feeder (CFF) for a xerographic copier. It relates to the Xerox "9400" copier accessory unit for feeding computer forms automatically to the copier platen in a controlled manner. (Very similar CFF disclosures, with the same filing date as said 4,320,960, are in U.S. 4,264,189; 4,264,200; 4,299,477; and 4,313,672.)

Other examples of sprocket (pin or tractor) drive CFF for copiers are disclosed in U.S. Pat. Nos. 3,446,554 issued May 27, 1969 to A. M. Hitchcock et al. (known as the "inch worm" or "2400 CFP" feeder); 3,804,514 issued Apr. 16, 1974 to Stephan A. Jasinski; 3,831,829 issued Aug. 27, 1974 to L. S. Karpisek; 3,973,846 issued Aug. 10, 1976 to W. A. Sullivan et al; 3,977,780 issued Aug. 31, 1976 to J. R. Cassano et al; 3,994,426 issued Nov. 30, 1976 to George J. Zahradnik et al; 3,997,093 issued Dec. 14, 1976 to Masahiro Aizwa et al; 4,079,876 issued Mar. 21, 1978 to M. A. Malachowski; 4,087,172 issued May 2, 1978 to M. C. Van Dongen; 4,300,710 issued Nov. 17, 1981 to R. Clark Du Bois, et al; and 4,334,764 issued June 15, 1982 to L. E. J. Rawson, et al; and in the EPO Publication No. 0 005 043 of EPC Application No. 79300627.1 on Oct. 31, 1979 corresponding to abandoned U.S. application Ser. No. 896,877 filed Apr. 17, 1978 by John F. Gardner and Robert L. Greco (D/77201). Some of the above CF feeders count pulses generated by the document feeding sprocket drive mechanism itself to control the CF web stopping and starting, as may be utilized herein. A CFF feeding control is also taught in "Research Disclosure" Bulletin Publication No. 23018, pp. 227–9, June 1983.

Other (non-sprocket drive frictional) CF feeders are known for microfilm cameras, e.g. U.S. Pat. Nos. 3,255,662 issued June 14, 1966 to D. D. Call and its divisional 3,442,503. These patents are of interest for their disclosure in FIGS. 3A and Col. 11 (middle) of a humped CF restacking plate 178.

Mechanical ratchet business forms web feeders are, of course, well known, e.g. U.S. Pat. No. 2,493,411 issued Jan. 3, 1950 to F. E. Lanegan et al..

Some examples of various other patents teaching conventional document handlers and also control systems therefor, including document path switches, are U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344 and 4,284,270. Conventional simple software instructions in a copier's conventional microprocessor logic circuitry and software of document handler and copier control functions and logic, as taught by the above and other patents and various commercial copiers, are well known and preferred. However, it will be appreciated that the document handling functions and controls described herein may be alternatively conventionally incorporated into a copier utilizing any other suitable or known simple software or hard wired logic systems, switch controllers, etc. Such software for functions described herein may vary depending on the particular microprocessor or microcomputer system utilized, of course, but will be already available to or readily programmable by those skilled in the art without experimentation from the descriptions provided herein.

The art on document feeding and positioning logic and control also specifically includes patents on servo motor driven and controlled document feeders for copiers. For example U.S. Pat. Nos. 3,768,904 issued Oct. 30, 1973 to V. Rodek; 3,888,579 issued June 10, 1975 to V. Rodek and R. Ticknor; 4,000,943 issued Jan. 4, 1977 to Ari Bar-On; 4,283,773 issued Aug. 11, 1981 to J. W. Daughton; 4,144,550 issued Mar. 13, 1979 to J. M. Donohue (Col. 53 et al. especially); and 4,310,236 issued Jan. 12, 1982 to J. L. Connin.

Art on auxiliary platen covers for copiers includes, for example, U.S. Pat. No. 3,726,589 issued Apr. 10, 1973 to A. P. Difulvio et al. and "Research Disclosure" No. 23004 p. 215–217 published June 1983.

Of interest for spacing of a manual document input tray from a platen with curvature of individual document sheets in a stack with a concave said document tray is U.S. Pat. No. 3,901,594 issued Aug. 26, 1975 to D. A. Robertson.

All references cited herein, and their references, are incorporated by reference herein for appropriate teachings of additional or alternative details, features, and/or technical background.

The present invention desirably overcomes or reduces various of the above-discussed problems.

A general disclosed feature herein is to improve the incremental feeding of a CF web to a copier platen for copying without requiring an expensive CF web feeder.

A further general feature is to provide a more compact and lower cost web document feeding accessory for various conventional copiers.

A specific feature disclosed herein is to provide, a continuous form document feeder for a copier, for incrementally feeding a computor form or the like web document from a fan-folded stack thereof to the imaging station of a copier with a web feeder, the improvement in the supply hopper in which the fan-fold web stack is stacked and from which the web is unfolded and fed out to be copied with said web feeder, wherein said supply hopper comprises:

a generally horizontal main stack supporting floor for supporting the principal portion of the stack of fan-fold web in said supply hopper;

a downstream stack edge retaining low wall extending upwardly not substantially above the maximum height of the stack of web to be fed from said supply hopper and adjacent the end of said supply hopper from which said web is to be fed out to be copied, said wall being adapted to retain one end of the stack of fan-fold web in said supply hopper but to provide low friction and low angle feeding of said web from the stack thereover, and a raised stack floor portion adjacent the end of said supply hopper opposite from said low wall and extending upwardly from said main floor to slightly tilt upwardly (relative to the rest of said stack) the end of the stack of fan-fold web in said supply hopper opposite from said low wall sufficiently to substantially reduce variations in the resistance to unfolding and feeding of said web from said stack thereof by said web feeder.

Further features which may be provided by the apparatus disclosed herein, individually or in combinations, include those wherein said raised stack floor portion extends upwardly at approximately 10 degrees to said main floor and is adapted to raise said opposite end of said stack by at least approximately 1 centimeter relative to the rest of the stack, wherein said wall has a height of only approximately 8 centimeters or less above said main stack supporting floor, wherein said wall is positioned adjacent one side of said imaging station and said web is fed directly from over said wall to said imaging station without intermediate guides for said web, wherein said web is fed across said imaging station under a thin removable plate auxiliary platen cover having spacing means for slightly spacing said auxiliary platen cover from said imaging station, and wherein said web is fed directly to said web feeder from said imaging station, and wherein said web feeder is at the opposite side of said imaging station from said supply hopper, wherein said web feeder is an incrementally driven low torque motor, wherein said copier has a conventional recirculating document handler pivotally mounted over said imaging station, wherein said auxiliary platen cover is sufficiently thin to allow said recirculating document to be closed over said auxiliary platen cover on said imaging station without damage, and wherein said auxiliary platen cover may be inserted and removed from said imaging station without removing said recirculating document handler.

Figure 2:
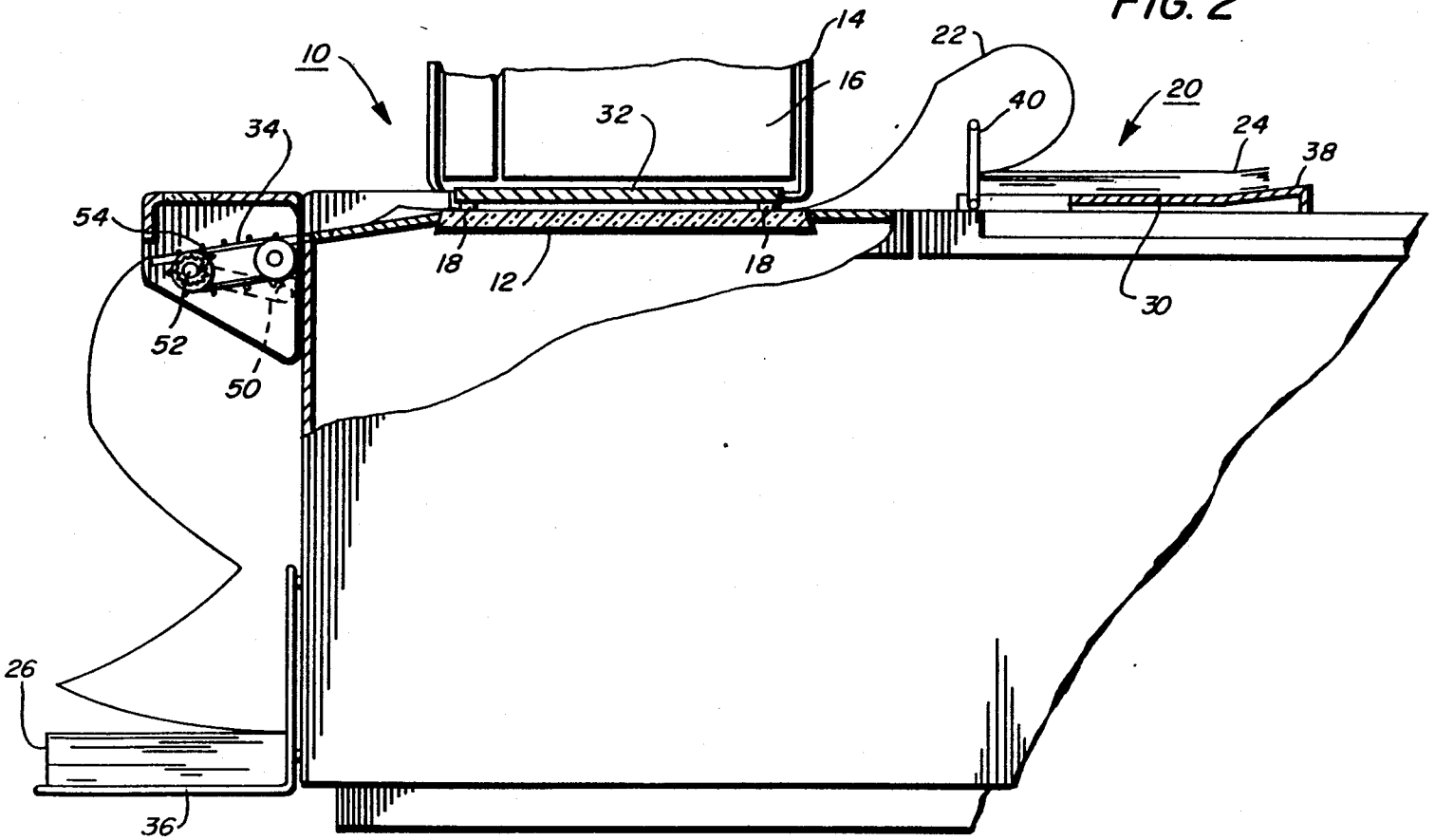

Various of the above-mentioned and further features and advantages will be apparent from the example described hereinbelow of a specific apparatus and its operation. The invention will be better understood by reference to the following description of one specific embodiment thereof including the following drawing figures (approximately to scale) wherein:

FIG. 1 is a perspective view of one embodiment of an exemplary CF document handling apparatus for a copier in accordance with the present invention; and FIG. 2 is a partially cross-sectional side view of the CF document feeder embodiment of FIG. 1.

FIGS. 1 & 2 illustrate a modern conventional copier 10 with its platen imaging station 12 for imaging documents to be copied. Also illustrated, and likewise not per se a part of this invention, is an exemplary known circulating document handler (RDH) 14 for presenting conventional individual sheet documents to the same platen 12. These documents are imaged under a main platen cover 16 which is part of the RDH 14. Various of the above-described references may be referred to for further details of these components. The disclosure hereinbelow relates to a computer forms feeder accessory kit 20 for feeding fan-fold web to be copied. That is, for feeding a continuous form web document, such as a CF22, from a fan-folded input stack 24 of said web 22. The web 22 is fed incrementally across the platen 12 for copying and then to an output stack 26 wherein the web 22 is restacked in its conventional zig-zag or fan-folded format, as shown in both FIGS. 1 and 2.

More specifically, the fan-folded web 22 is initially stacked 24 in a computer forms input tray or supply hopper 30, to be described further herein. Web 22 is then unfolded and fed out from the top of the stack 24 to be copied by being pulled under an auxiliary platen cover 32 placed over the platen 12 in lieu of the main platen cover 16. Next the web 22 passes through an incremental web drive unit 34, which provides the only web feeder required in this embodiment. From this web feeder 34 the web 22 is restacked as an output stack 26 in an output tray 36 at the side of the copier 10 under the drive unit 34.

The computer forms feeder accessory unit 20 features particularly addressed herein are the improvements in the input tray or supply hopper 30 which greatly reduce fluctuations in the resistance to feeding of the CF web by the drive unit 34, therefore improving registration, without requiring, as has been heretofore practiced, a large vertical wall or bail, or other large, space-consuming, web guides. The present system enables the use of low torque, low power, and low cost conventional tractor or "kidder" sprocket pin drives for the CF web 22 in drive unit 34, such as are utilized in typewriters or low-cost computer printers for home computers or the like. Since both this drive unit 34, the input tray 30, output tray 36 and auxiliary platen cover 32 are all simple and low cost and compact items, the entire computer forms feeder accessory kit 20 can be provided for an existing copier to provide automatic computer forms or other web document feeding therefor with a small additional cost and no modification whatsoever of the existing copier other than to simply mount these components thereon and make a simple electrical connection thereto.

Referring now to the supply hopper or input tray 30, it has a generally conventional, generally horizontal main stack supporting floor for supporting the principal portion of the stack 24 of fan-fold web in said supply hopper. This may be a portion of the upper surface of the copier 10, if desired. However, it will be noted that this main stack supporting floor does not support or underly the entire CF input stack 24. Rather the upstream end portion of the input stack 24 is tilted upwardly by a raised surface portion 38. This surface 38 tilts this one end of the stack 24 upwardly relative to the rest of the stack. It provides an initial curve or buckle to the edges of the fan-fold web adjacent their fold lines, which are at the edges of the stack.

The supply hopper 30 further includes a downstream end wall 40 providing a downstream stack 24 edge retaining wall. However this wall 40, unlike conventional CF walls, is quite low, extending upwardly not substantially above the maximum height of the stack 24 of web to be fed from the supply hopper 30. This low wall 40 is adjacent the end of the supply hopper 30 from which the web 22 is to be fed out to be copied, i.e. at the opposite end of the stack 24 from the raised stack support portion 38.

Wall 40 may, if desired, be pivotable down for storage flush with the stack supporting main floor of the supply hopper 30. However, because it is sufficiently low and not obstructive, it may be preferably left raised in its illustrated vertically extending position on the copier 10, and utilized alternatively for other purposes, e.g. storing other documents (sheets), completed copies, or the like.

The low wall 40 is adapted to retain the downstream end of the stack, i.e. to prevent part of the stack 24 from being pulled out of the stack 24 towards the platen 12 while still folded or partially folded. The top of the wall 40 here is a smooth, rounded surface, such as a round metal rod, to provide low friction feeding of the web from the stack thereover.

Unlike previous such CFF feeding walls, wall 40 provides for relatively low-angle feeding of the web 22 from the stack 24 over the top of the wall. Note that contact between the web 22 and the top of the wall 40 normally only occurs for that portion of the folding and feeding of the web 22 from the stack 24 subsequent to that illustrated FIG. 2, i.e. when the folded edge adjacent to wall 40 is being pulled up over the wall 40. Where the last fold was at the upstream end of the stack 24 the web 22 beam strength normally holds it out of contact with the wall 40 altogether, as shown in FIG. 2.

The fact that the web 22 is fed at all times from the top of the stack 24 at a relatively low angle, and not substantially higher than the top of the stack 24, is an important advantage allowing direct feeding of the web 22 from the stack 26 to the platen 12 without requiring any intermediate guides or feeders. It also allows the entire input hopper 30 to be located closely adjacent to, and on the same level with, the platen 12 on top of the copier 10. If the wall 40 were much higher, tension on the web 22 would tend to lift up or drag against the entrance edge of the auxiliary platen cover 32 to create friction and feeding problems. However heretofore such a high wall 40 or a comparable feeding arrangement was considered necessary to reduce non-uniform resistance or feeding forces in the unfolding and feeding of the CF web from its input stack.

This non-uniform feeding force has heretofore made it quite difficult to feed the continuous form web out horizontally from a horizontal fan-fold stack thereof without an intervening high wall or other guide extending upwardly for a substantial vertical distance above the stack of the fan-folds. Since the individual segments or sheets of a fan-fold stack are fastened together at their fold lines at alternating opposite ends of the stack simply pulling the web segment on the top of the stack horizontally tends to be highly resisted by the stack. A flat web segment on the stack has a substantial beam strength which tends to transmit the pulling force directly to the next sheet and therefore to the stack. In fact the pulling is likely to pull the entire stack rather than pulling off the top sheet unless the downstream edge of the stack is retained from movement, and this horizontal feeding force is quite non-uniform. Once the downstream fold edge of the web sector has begun to lift or curl away from the rest of the stack, its feeding resistance becomes quite low and remains quite low as the web continues to feed out until the next fold line is reached, at which point the feeding resistance suddenly rises rapidly again until the curling away of the next two web sectors is initiated at the upstream edge of the stack. Thus, horizontal feeding of web from a fan-fold stack has heretofore been avoided in favor of pulling the web vertically off of the horizontal stack, or at a substantial vertical angle, by initially pulling the web over a relatively high wall or guide adjacent the stack, as shown in various of the cited references herein, e.g. bail 24 of U.S. Pat. No. 4,300,710 and the member 44 of U.S. Pat. Nos. 4,320,960, or 4,264,200 for example. This high wall provides a sufficiently vertical force vector component to initiate the unfolding of the web from its fan-fold configuration in the stack with reduced fluctuations or variations in the required pulling force, i.e. a more uniform resistance to unfolding and feeding.

However, as disclosed herein, it has been discovered, and confirmed by testing, that with an appropriately configured supply hopper surface 38, a wall 40 may be used which is not substantially higher than the height of the web stack to be fed so that feeding may be substantially horizontally therefrom e.g. a wall 40 of a height of only approximately 8 centimeters or less above the main stack-supporting floor. It has been found that by providing a slight tilt or initial curl to the upstream end of the fan-fold stack 24 that fan-fold web 22 may be fed from the opposite (downstream) end thereof over such a very low wall or stack end guide 40, i.e. substantially horizontally, yet with greatly reduced variations and resistance to unfolding and feeding of the web 22 from the stack 24 thereof. It has been found that this may be accomplished by raising said opposite end of the stack by as little as one centimeter relative to the rest of the stack. As shown, this is preferably provided by a raised upstream stack-supporting floor portion 38 which extends upward from the main floor portion at approximately 10° thereto. While this surface 38 is shown as a smooth transition and integral with the main horizontal stack-supporting floor, it will be appreciated that the same function may be provided by an inserted block or other member in the tray 30 at the position underlying the upstream end of the fan-fold stack 24. This very slight precurl of the upstream edge of the stack 24 is sufficient to reduce greatly the feeding resistance of the web 22 to separation from the stack 24 at the critical intermittent time periods when the upstream portion of the web 22 is initiating the pulling of the upstream edge of the top of the stack.

This substantial reduction in fluctuations in the resistance to unstacking and feeding of the CF web also allows, and improves, the web copying registration accuracy for simple mechanical motor or clutch braking of the web drive unit 34. If the web feeding resistance varies greatly, then the stopping or "coasting" time and distance of the web 22 after the drive unit 34 is stopped will also fluctuate, therefore making corresponding changes in the stopping position of the web 22 segment on the platen 12 and therefore changing the imaging position of the information thereon. This is avoided by the present system. Therefore expensive web position sensors or servo controls for the web feeder are not required.

The initial registration of the first web increment may be established manually by manually feeding the initial portion of the web 22 through the system with the first image in its correct imaging position on the platen 12. Thereafter, when the selected number of copies of that web segment is completed, the copier controller automatically actuates the incremental web drive unit 34 to feed the web 22 by one selected incremental distance and automatically stops for imaging the next desired web sector. This is repeated until the entire web stack 24 has been fed and copied. No further registration of the document is required, i.e. reregistration of each subsequent web segment is automatically accomplished simply by driving the web sprocket drive unit 34 for a known and fixed distance, and then stopping it.

Referring further to the auxiliary platen cover 32, this may be, with the present system, a simple plate of rigid or semi-rigid molded plastic or the like. It is not permanently mounted to the copier 10. Rather it may be hung therefrom inside a cover door for the copier, or behind the copier, or the like, when it is not in use. When CF copying is desired the regular document feeder 14, is simply raised up out of the way as if manual copying were to be done on the platen with the cover raised. Then this auxiliary platen cover 32 is merely laid onto the platen 12.

The rear of the auxiliary platen cover 32 contains slots or grooves for alignment with pins which may be part of the hinge assembly for the existing document handler unit 14. This provides mounting alignment of the cover 32 over the platen 12. A desired spacing of the platen cover 32 from the platen 12 may also be provided by this mounting of the rear of the cover 32 to a raised mounting surface of the RDH 14, and by supporting the front of the cover 32 on an existing slightly raised hold-down clamp for the front of the platen glass (not shown).

Alternatively, as illustrated, both the front and the back of the auxiliary cover 32 may have spacers 18 which are integral extensions or extrusions of the otherwise planar, white, bottom surface of the auxiliary cover 32. These platen cover spacers 18 may be adapted to rest directly against the platen glass 12, or on an adjacent part of the copier, and to support the rest of the auxiliary platen cover 32 so that its bottom surface is slightly spaced by the fixed distance provided by the spacers 18 above the upper surface of the platen 12. The spacers 18 are preferably spaced well outside of the imaging path and imaging area of the web 22.

In either case, this auxiliary cover 32 spacing distance is selected to be greater than the thickness of the web 22, so as to provide for a low friction feeding therethrough, but be sufficiently close to the platen to partially flatten the folds in the web 22 to hold the web 22 to within the depth of field or focus of the imaging system of the copier.

By providing an immediately upstream lateral edge guide for the input stack 24 and with the sprocket drive 34 closely downstream, no other lateral edge guide is needed for maintaining lateral alignment of the CF web on the platen, by the cover 32 or any other element. This further reduces drag and potential jam problems.

The entire auxiliary platen cover 32 may be made sufficiently thin so that even if the regular RDH 14 is accidentally lowered thereon, there will be no damage to the main platen cover 16 of the RDH or any other components. That is, the auxiliary platen cover may be within the acceptable thickness range of a "document" left on the platen 12. However, here alternatively an integral handle of the auxiliary cover 32 is formed and positioned, as illustrated in FIG. 1 so as to serve as a downstop to prevent such damage. This handle/stop extends upwardly at a frontal position to engage an appropriate front edge area of the RDH 14, such as its latch, when closure is attempted. This prevents any damaging contact between the main platen cover surface 16 and the auxiliary cover 32.

There is additionally disclosed herein an additional or alternative type of web drive unit. This is an even lower cost drive than the drive 34, comprising a simple mechanical incremental drive manually incremented by the copier operator. With this system, the tractor or sprocket drive for the CF web is incrementally moved by a lever arm 50 acting through a connecting shaft 52. A pawl mechanism 54 or other clutch arrangement provides for unidirectional movement of the web in the downstream direction and low resistance return of the lever arm 50 by a spring to an initial starting position. The lever arm 50 is pushed or rotated by the operator in the downstream or web-feeding direction for a preset distance, which provides a corresponding preset incremental movement to the web 22, i.e. movement of the web by one web segment to be imaged. An adjustable stop 56 may be provided by a stop member adjustably positioned within a slot or the like to adjustably stop the forward motion of the lever arm 50 at a selected end of stroke position and therefore adjust the stroke length and corresponding web feeding movement of the lever 50. Preferably the lever arm 50 is removable, particularly if this mechanical feeding is provided as an alternative for the more conventional electric motor drive of the sprocket belt drive system as previously discussed. With this alternative mechanical drive, there is no electrical connection required to the copier at all.

The web feeder in either case may be a simple conventional pair of rubber sprocket feed belts commonly driven on a single shaft, and adjustably spaced apart to accommodate different width webs, as is conventional. The preferred drive unit 34 has a low-cost DC permanent magnet motor with a connecting sensor/timing disc assembly for sensing and measuring the motor rotation by providing on the disc a selected number of apertures or teeth which are conventionally sensed by an associated sensor to provide pulses. By having one pulse correspond to the motion of one hole on the CF web, a very simple control software may be provided by simply counting the pulses so generated and comparing that count to a desired web incremental feeding distance (in web sprocket hole count). Frame registration can be provided by simply stopping the motor drive when the desired count is reached by disconnecting the power thereto (and, if desired, braking by dynamic resistance or actuating a mechanical friction brake). The incremental feeding of the CF web can therefore be easily controlled. Minor fluctuations in the motor speed do not effect the registration. Registration is affected only by fluctuations in the braking of the web from the time the last count or count parity is achieved, and the stop control signal therefrom is provided, until the time the web actually stops moving. As discussed above, the present system greatly reduces such fluctuations. A separate brake is not required if this stopping distance is consistent and there is sufficiently consistent friction in the drive and the overall web feeding. Providing the web feeding resistance is relatively uniform, the web stopping time, and therefore stopping distance, will also be uniform for each segment. This uniformity is provided as disclosed herein.

While the embodiments disclosed herein are preferred, it will be appreciated that they are merely examples, and that various alternatives, modifications, variations or improvements thereon may be made by those skilled in the art from this teaching, which are intended to be encompassed by the following claims.

What is claimed is:

1. In a continuous form document feeder for a copier, for incrementally feeding a fan-fold web form document from a fan-folded stack thereof in a generally horizontal stack support, to the generally horizontal imaging station of a copier with a web feeder, the improvement comprising:

means for unfolding and pulling said fan-folded web form from said stack from one end of said stack support in a generally horizontal direction towards said imaging station with said web feeder with a low and substantially uniform unfolding and pulling resistance, said means including;

means for providing said stack support on said copier horizontally spaced from one side of said imaging station, a low wall extending upwardly not substantially above the maximum height of the fan-folded stack and adjacent said end of said stack support from which said web is being pulled, said wall being adapted to retain one end of the fan-folded stack in said stack support and providing low friction and low angle feeding of said web from the top of the fan-folded stack over the top of said low wall, and stack end tilting means adjacent the opposite end of said stack support from said low wall and extending upwardly from said stack support for tilting upwardly (relative to the rest of the fan-folded stack) the end of the fan-folded stack opposite from said low wall by an amount of tilt sufficient to substantially reduce variations in said resistance to unfolding and pulling of said web from said fan-folded stack thereof over said low wall to said imaging station by said web feeder.

2. The document feeder of claim 1 in which said stack end tilting means comprises a raised end portion of said generally horizontal stack support extending upwardly at approximately 10 degrees to said generally horizontal stack support for raising said opposite end of the stack by at least approximately 1 centimeter vertically relative to the rest of the stack.

3. The document feeder of claim 1 in which said stack end tilting means is adapted to raise said opposite end of the stack by at least approximately 1 centimeter relative to the rest of the stack.

4. The document feeder of claim 1 in which said low wall has a height of only approximately 8 centimeters or less above said generally horizontal stack support.

5. The document feeder of claim 1 wherein said low wall is adjacent to said one side of said imaging station and said web is fed directly from over said low wall generally horizontally to said imaging station and without intermediate guides for said web.

6. The document feeder of claim 1 wherein said web is fed across said imaging station under an auxiliary platen cover comprising a rigid or semi-rigid plate of dimensions corresponding generally to said imaging station and adapted to overly said imaging station and spacing means adjacent opposite edges of said imaging station for slightly spacing said plate from said imaging station to provide a web guide path between said plate and said imaging station closely confining the web over said imaging station, said plate being fully removable from said copier, and wherein said web is pulled to said web feeder from said imaging station and wherein said web feeder is at the opposite side of said imaging station from said stack support.

7. The document feeder of claim 1 wherein said web feeder comprises an incrementally driven low torque motor mounted to one side of said copier adjacent the side of said imaging station opposite from said side of said imaging station where said stack support is on said copier.

8. The document feeder of claim 6 wherein said copier has a document handler unit, including a platen cover, pivotally mounted to said copier over said imaging station, and wherein said auxiliary platen cover has integral protective means to prevent damage to said document handler unit from its attempted closure over said auxiliary platen cover on said imaging station, and wherein said auxiliary platen cover may be inserted and removed from said imaging station without removing said document handler unit from said copier.

9. The document feeder of claim 1 wherein said stack end tilting means comprises a raised end portion of said stack support extending upwardly at approximately 10 degrees to said generally horizontal stack support for raising said opposite end of said stack by at least approximately 1 centimeter vertically relative to the rest of the stack; and wherein said low wall has a height of only approximately 8 centimeters or less above said generally horizontal stack support.

10. The document feeder of claim 9 wherein said web is fed across said imaging station under an auxiliary platen cover comprising a rigid or semi-rigid plate adapted to overly said imaging station and spacing means adjacent opposite edges at said imaging station for slightly spacing said plate from said imaging station to provide a web guide path between said plate and said imaging station closely confining the web over said imaging station, said plate being fully removable from said copier, and wherein said web is pulled to said web feeder from said imaging station and wherein said web feeder is at the opposite side of said imaging station from said stack support; and wherein said copier has a document handler unit, including a platen cover, pivotally mounted to said copier over said imaging station, and wherein said auxiliary platen cover has integral protective means to prevent damage to said document handler unit from its attempted closure over said auxiliary platen cover on said imaging station, and wherein said auxiliary platen cover may be inserted and removed from said imaging station without removing said document handler unit from said copier.

11. The document feeder of claim 1 wherein said low wall is adjacent one side of said imaging station and said web is fed directly from over said wall generaly horizontally to said imaging station; and wherein said stack support is integral the upper surface of said copier and wherein said low wall is pivotally mounted for pitoval movement to a generally horizontal non-obstructing position integral said stack support.

* * * * *